GAVIN D. JENNEY
INVENTOR.

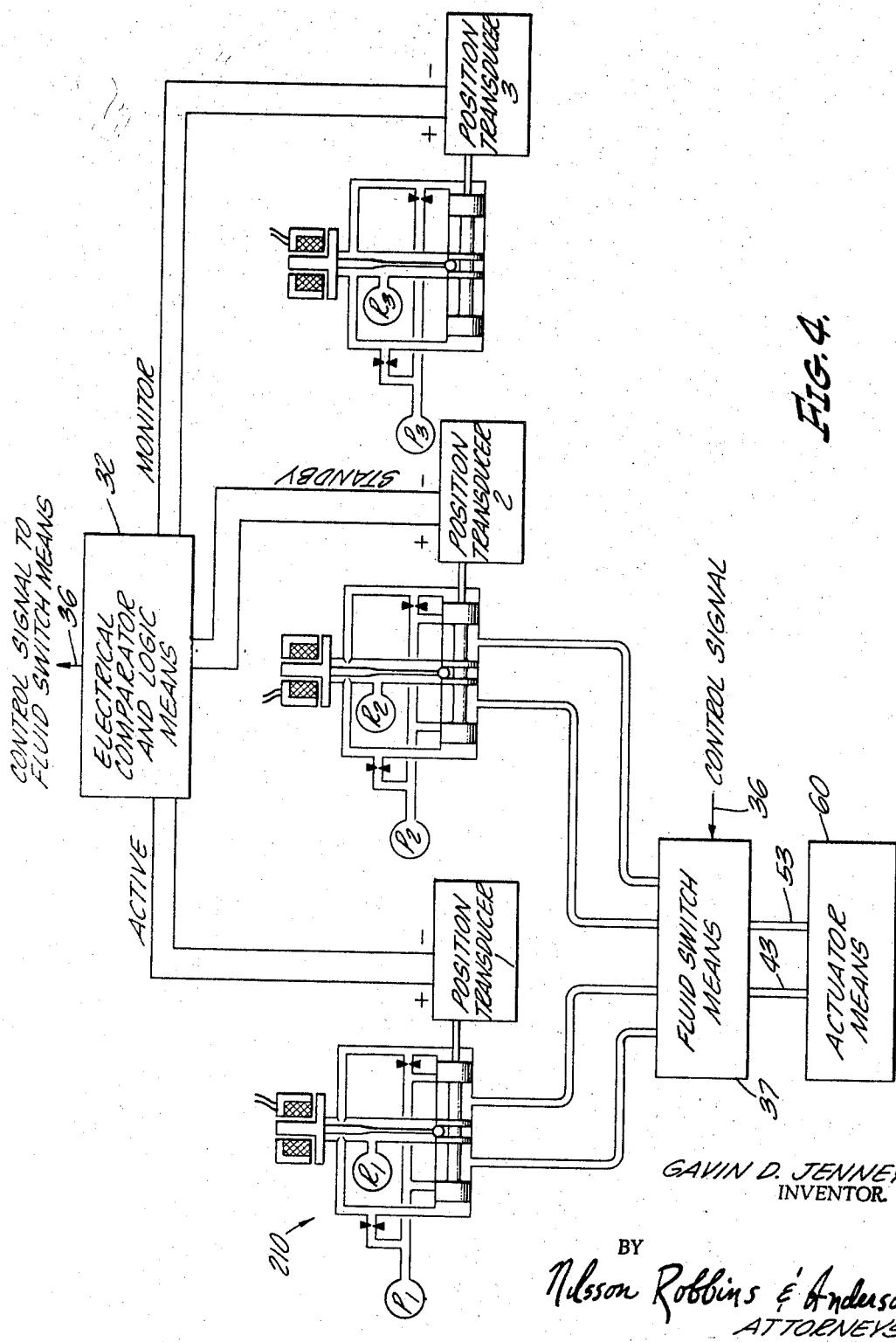

United States Patent Office 3,437,312
Patented Apr. 8, 1969

3,437,312
ELECTRICAL SIGNAL AND MONITORING APPARATUS FOR REDUNDANT CONTROL SYSTEM
Gavin D. Jenney, Arleta, Calif., assignor to Bell Aerospace Corporation, a corporation of Delaware
Filed Nov. 1, 1966, Ser. No. 591,297
Int. Cl. F01d 17/00; F15b 13/16
U.S. Cl. 253—1  9 Claims

ABSTRACT OF THE DISCLOSURE

A redundant control system having an active, standby, and monitor electrical signals applied to an electrical comparator and logic to develop an output signal in the event of non-coincidence in the electrical signals. The output signal is utilized to operate a fluid switch means to control the flow of fluid under pressure through first or second servo valve to an actuator which positions a load. The electrical comparator and logic means may take the form of differential transformers to which the active, standby and monitor signals are applied so as to detect discrepancy in any one of the signals with respect to the other two. The output of the differential transformers is rectified and applied to a voltage level switch means which produces an output signal only in response to the output of the rectified signal being above a predetermined level.

---

This invention relates generally to hydraerically-powered redundant control systems and more particularly to apparatus for monitoring such a system and detecting a channel in which a malfunction occurs and for disabling the same through the use of electrical signals.

The term "hydraeric" and its derivtaives as used throughout this specification and the claims appended hereto is defined as being generic to hydraulic and pneumatic and as synonymous, in the broad sense, with fluid under pressure.

In most prior art redundant control systems it has been traditional to monitor the various channels in the control system at a part of the system which includes other signals in addition to the electrical signals such as input and/or feedback signals. For example, monitoring often occurs at the spool valve of the servo valve and thereby includes not only the electrical and the feedback signal applied to the system but in addition thereto, certain of the hydraeric information in the system. Although such monitoring is quite effective and operates exceedingly well in all applications, it has been found that under certain circumstances it is desirable to monitor the electrical signals separately and disable any malfunctioning channel when the malfunction is present in that portion of the system which generates an electrical signal that is applied to the system or the malfunction is present in the electrical feedback signal. Such electrical monitoring and disabling system is traditionally utilized with other monitoring and switching apparatus which would be specifically adapted to monitor the other portions of the signals in the system than the electrical or including the electrical as a particular case may warrant.

Alternatively, an electrical signal proportional to spool valve position may be generated within the system and used to monitor and disable as above pointed out.

Accordingly, it is an object of the present invention to provide apparatus for detecting errors in electrical signals within a redundant control system and for disabling a malfunctioning part of the system prior to any deleterious effect upon the load connected to the system, i.e., without system performance degradation.

It is another object of the present invention to provide apparatus for detecting errors in electrical signals applied to a redundant control system while maintaining complete isolation between the active, standby and monitoring channels of the control system.

In is a further object of the present invention to provide apparatus for detecting errors in electrical signals applied to a redundant control system which is insensitive to load variations which may be imparted to the actuator.

It is still a further object of the present invention to provide apparatus for detecting errors within a failed channel through the use of electrical signals generated within such channels and to effect disabling of such failed channel.

Other objects and advantages of the present invention will become apparent from a consideration of the following description taken in conjunction with the accompanying drawings which are presented by way of example only and are not intended as a limitation upon the scope of the claims appended hereto and in which:

FIGURE 4 is a schematic diagram showing a redundant control system wherein electrical signals are generated within the system for monitoring and switching by application to structure as shown in FIGURES 2 and 3 in accordance with the present invention.

The apparatus for monitoring and for switching out a failed portion of a redundant control system in the event of a failure through use of electrical signals in accordance with the present invention includes an active and a standby control channel, each of which includes servo valve means connected for controlling the flow of hydraeric fluid from separate sources thereof through a fluid switch means to an actuator to position a load. There is also provided a monitor and switching channel. Where only the electrical input signals to the servo valves are monitored, each of the channels includes electrical input signal receiving means which receives signals from an electrical signal generating means, typically the signals being identical. An electrical comparator and logic means receives the output of the electrical signal receiving means in the active, standby and monitor channels and compares them to ascertain whether or not there is agreement between each of the electrical signals in each of the channels. If there is a disagreement the logic means develops a failure signal which is applied to the fluid switching means to disable that portion of the system within which the failure has occurred.

Alternatively to or in conjunction with monitoring of the input electrical signals, there may be provided means for generating an electrical signal proportional to input and output information combined. Such means may take the form of a position transducer cooperatively connected to each of the servo valve means provided in each of the channels for generating an electrical signal. The electrical signal so generated is applied to the comparator and logic means which then functions as above pointed out.

Figure 1:
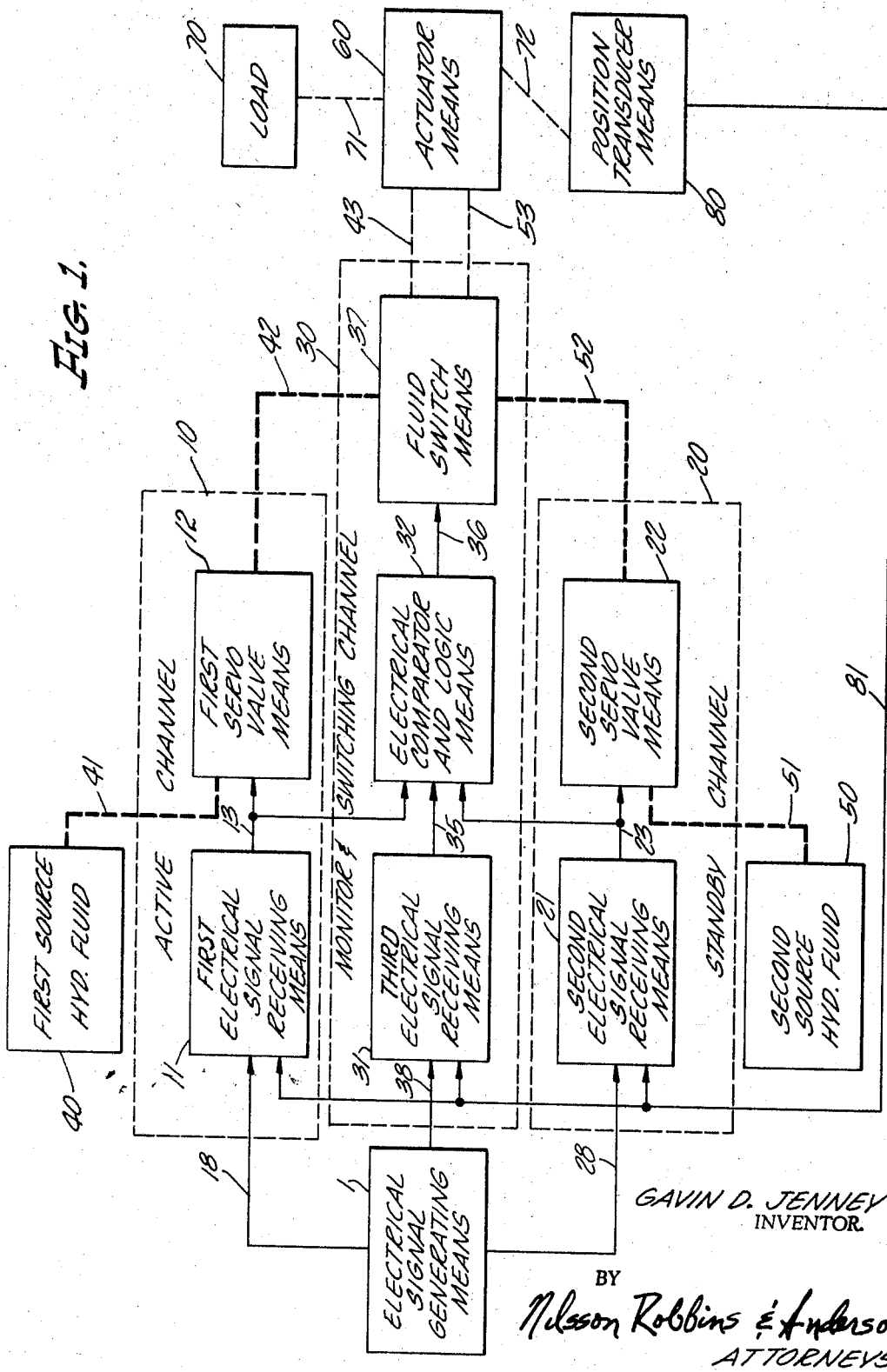
FIGURE 1 is a schematic diagram in block form of a redundant control system including the electrical monitoring and switching apparatus in accordance with the present invention.

Referring now to the drawings and more particularly to FIGURE 1 there is illustrated therein in block diagram a control system including the apparatus for monitoring the electrical signals and switching out or disabling a failed portion of the control system. As is illustrated there is included an active channel 10, a standby channel 20 and a monitor and switching channel 30. The active channel 10 includes a first electrical signal receiving means 11 and a first servo valve means 12. The first servo valve means 12 is connected by way of lead 13 to the first electrical signal receiving means 11. The standby channel 20 includes a second electrical signal receiving means 21 and a second servo valve means 22 which is connected by way of lead 23 to the second electrical signal receiving means 21. The monitor and switching channel 30 includes a third electrical signal receiving means 31 and an electrical comparator and logic means 32. The electrical comparator and logic means 32 is connected by way of leads 33, 34 and 35 to the first, second and third electrical signal receiving means 11, 21 and 31 respectively. The output of the electrical comparator and logic means 32 is connected by way of lead 36 to fluid switch means 37. The output signals from an electrical signal generating means 1 is connected by way of leads 18, 28 and 38 as input signals to the first, second and third electrical signal receiving means 11, 21 and 31 respectively. A first source of hydraeric fluid 40 is connected by way of conduit 41 to the first servo valve means 12. The output hydraeric fluid from the first servo valve means 12 is connected by way of conduit means 42 to the fluid switch means 37. Under those circumstances when the hydraeric fluid from the active channel is applied to the actuator means 60 the fluid therefrom is applied through the fluid switch means and the conduit means 43 to the actuator means 60.

There is also provided a second source of hydraeric fluid 50 which is connected by way of conduit 51 to the second servo valve means 22. The output of the second servo valve means 22 is applied by way of conduit 52 to the fluid switch means 37. Under those circumstances when fluid from the standby channel is applied to the actuator means 60, the same flows through conduit means 53 to the actuator means 60.

Thus the first and second servo valve means 12 and 22 is controlled by the electrical signals applied thereto upon leads 13 and 23 respectively. Movement of the first and second servo valve means controls the flow of fluid from the first and second sources of hydraeric fluid respectively in response to the electrical signals. Output hydraeric fluid from the servo valve means is applied through the fluid switch means 37 as above described and under the circumstances above described to the actuator means to cause it to move. Movement of the actuator means in turn positions a load 70 by way of the mechanical interconnection 71 therewith to the desired position as commanded by the electrical signals applied to the system. Also mechanically connected to the actuator means by way of the linkage 72 is a position transducer means 80. The output of the position transducer means typically is an electrical signal which is applied as a feedback signal by way of lead 81 to the first, second and third electrical signal receiving means as illustrated. Typically, the feedback signal from the position transducer means is a negative feedback signal for stability purposes.

The particular servo valve, shutoff and engage valves, actuator and the like which are utilized in the hydraeric portion of the system are considered to be well known in the art and a detailed illustration or description thereof is not deemed necessary; however, for those desiring, reference may be had to Patent No. 2,947,286 issued Aug. 2, 1960 as illustrative of a servo valve which may be utilized in the system of the present invention and to Patent 2,995,014 issued Aug. 8, 1961 as illustrating an actuator means, and various shutoff, engage and other type valves normally utilized in a redundant control system for purposes of controlling the flow of hydraeric fluid therethrough.

Figure 2:
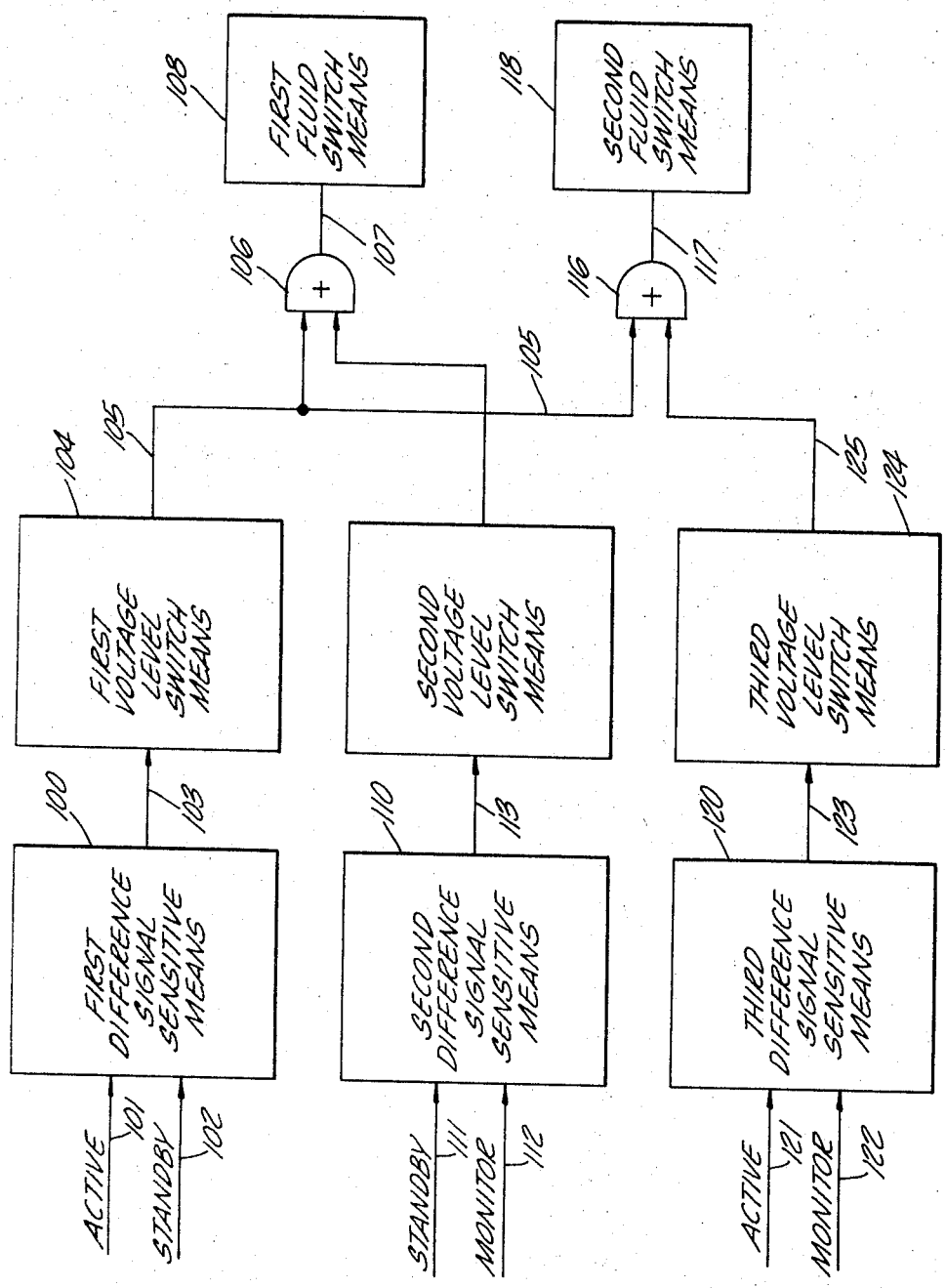
FIGURE 2 is a schematic diagram in block form illustrating in further detail the electrical comparator and logic means shown in FIGURE 1.

Referring now to FIGURE 2, there is therein illustrated more in detail an electrical comparator and logic means in block form which may be used in accordance with the monitoring and switching portions of the present invention. As is therein shown, first, second and third difference signal sensitive means 100, 110 and 120 respectively are illustrated. The active and standby electrical signals are applied by way of leads 101 and 102 to the first difference signal sensitive means 100. The standby and monitor signals are applied by way of leads 111 and 112 to the second difference signal sensitive means 110 while the active and monitor electrical signals are applied by way of leads 121 and 122 to the third difference signal sensitive means 120.

In the event that there is a disparity in the active and standby signals applied to the first difference signal sensitive means 100 an output signal is developed thereby and is applied by way of lead 103 to the first voltage level switch means 104. If the level of the signal so developed is of a sufficient magnitude the first voltage level switch means 104 closes and applies an output signal therefrom by way of lead 105 as one input to the logic "and" gate denoted by the symbol 106.

In the event that there is a discrepancy between the standby and monitor signals, the second difference signal sensitive means develops an output signal which is applied by way of lead 113 to the second voltage level switch means 114. The output signal so applied being of a predetermined sufficiently high magnitude will cause the switch means 114 to close thus applying an output signal on lead 115 as a second input to the logic "and" gate 106. Upon the coincidence of the input signals to the "and" gate 106, an output signal is passed from the logic "and" gate 106 by way of the lead 107 to a first fluid switch means 108. Upon actuation of the first fluid switch means 108 the typical shutoff and engage valves normally utilized in hydraeric control systems are activated to switch or disable the failed part of the redundant system. In the example just described, for example, since coincident output signals are applied to the gate 106 by tracing back to the first and second difference signal sensitive means 100 and 110 and to the signals applied thereto, it can be seen that the error must occur in the standby channel. Thus since normally the active channel is the one controlling the system, the first fluid switch means upon activation would merely disable the standby channel to preclude its control of the hydraeric system, even in the event of a failure in the active channel at some subsequent point in time.

Returning again to FIGURE 2, in the event that there is a discrepancy between the active and monitor signals applied to the third difference signal sensitive means 120, an output signal is developed thereby and is applied by way of lead 123 to the third voltage level switch means 124. In the event that the voltage signal applied to the switch means 124 is sufficiently high in magnitude, an output signal is passed by way of lead 125 as one input to the logic "and" gate 116. It will be seen that the other input to the logic "and" gate 116 is the output signal from the first voltage level switch means which is applied by way of the lead 105'. Upon coincidence of the signals applied to the logic "and" gate 116, a signal is passed by way of lead 117 to the second fluid switch means 118 which, upon the actuation thereof, activates the desired shutoff and engage valves to control the flow of hydraeric fluid according to the signals received. In this specific example, if an output signal is received from the logic "and" gate 116, it is an indication that there is an error detected in the first and third difference signal sensitive means 100 and 120. By tracing back to the signals applied thereto, it can be seen that for a common error signal to be developed through each of these two channels, the active channel must have developed an error. Thus the output signal from the first voltage level switch means is applied to the logic "and" gate 106 and to the logic "and" gate 116. However, since no signal is coincident with that applied to the logic "and" gate 106 nothing occurs in the first fluid switch means 108. However, since there is coincidence of the two signals at the logic "and" gate 116 the second fluid switch means actuates and in this particular example transfers or switches control of the hydraeric system from the active to the standby channels.

It should be noted by way of further example that in the event there is an error in the monitor channel, the signals applied to the second and third difference signal sensitive means 110 and 120 develop output signals which appear at the output of the second and third voltage level switch means 114 and 124, namely, on leads 115 and 125. These two signals are then applied individually as one of the inputs to the logic "and" gates 106 and 116. Since there is no coincidence of applied signals at the logic "and" gates, nothing occurs at this point in time. It should be noted, however, that these signals remain, so long as there is an error in the monitor channel, as an input to the two logic "and" gates 106 and 116. Thus upon the occurrence of an electrical signal error in either the active or the standby channel, there is then coincidence of input signals to each of the logic "and" gates 106 and 116, thus causing activation of each of the fluid switch means 108 and 118. Under these circumstances, the control system is transferred to a fail-safe mode of operation in which typically control of the particular apparatus which constitutes the load 70 is returned automatically to the operator, i.e., manual mode.

Figure 3:
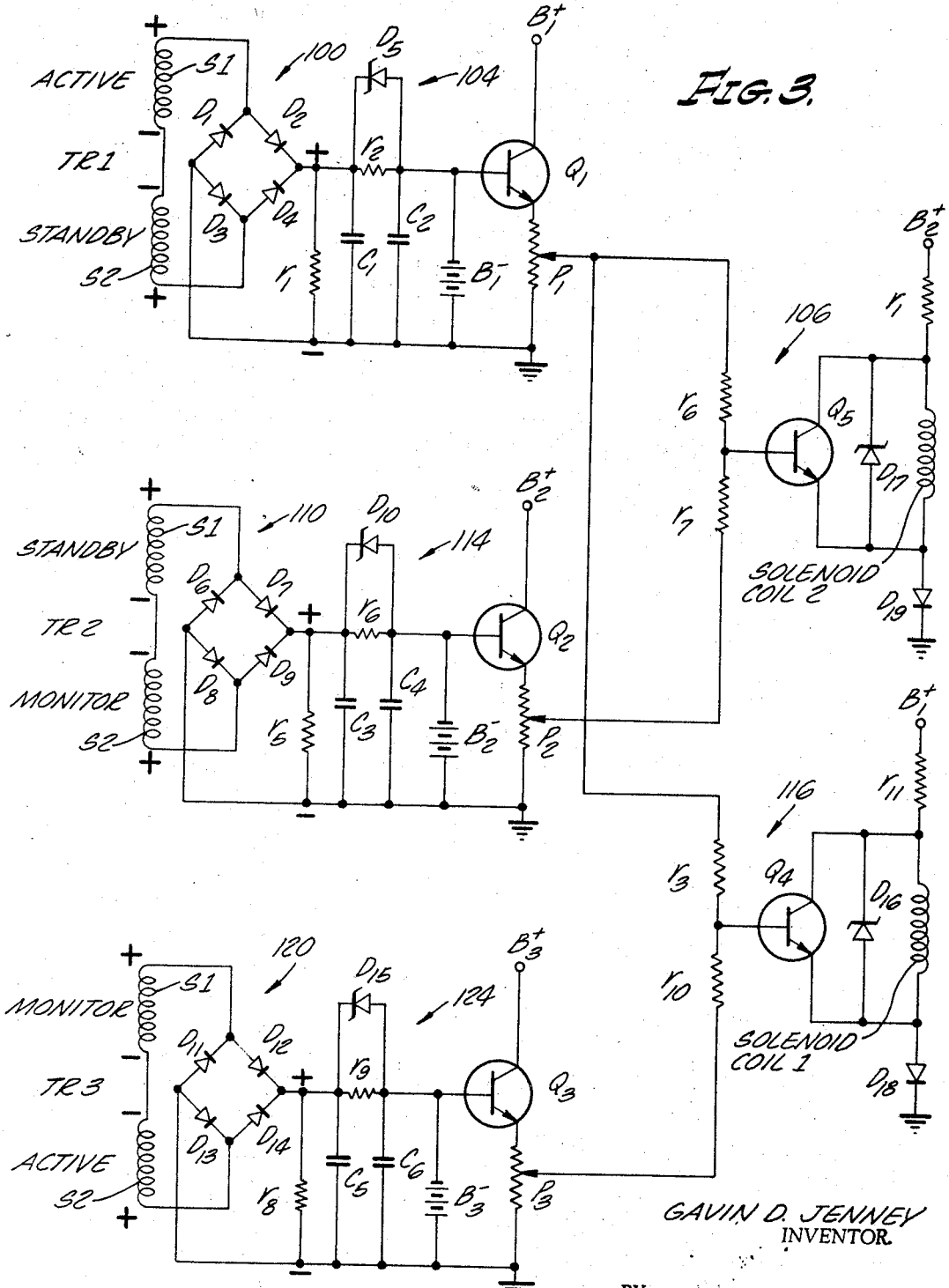
FIGURE 3 is a schematic diagram showing further details of the block diagram illustrated in FIGURE 2.

By referring now to FIGURE 3, a detailed schematic diagram of the electrical comparator and logic means as illustrated in block diagram in FIGURE 2 is shown. It will be noted from FIGURE 3 that each of the sections of the comparator and logic means includes duplicates and as a result thereof only one of each of the duplicated sections is herein described in detail, it being understood thereafter that the remaining of the duplicated sections operates in substantially the same manner with like results.

As is illustrated in FIGURE 3, the first difference signal sensitive means 100 includes a differential transformer TR1, only the secondary windings thereof being illustrated. As is shown by the polarity marks, the secondary windings S1 and S2 of the differential transformer TR1 are connected in series opposition such that an output signal taken across the two secondaries is zero except when there is a difference in the voltage appearing across one of the secondary windings as compared to the other. Under these circumstances, the signal appearing across the entire secondary winding is the difference. As is indicated the secondary winding S1 has applied thereto the active signal while the secondary winding S2 the standby signal. It will be readily recognized by those skilled in the art that the primary winding (not shown) for differential transformer TR1 to which the active and standby signals are applied are not interconnected as are the secondary windings.

A bridge rectifier consisting of diodes D1 through D4 is connected across the secondary windings of the differential transformer TR1. The bridge rectifier is interconnected in such a manner that only a positive output signal is developed across the R–C filter consisting of the resistor $r1$ and the capacitor C1. For example, if the positive going signal as indicated by the + sign across secondary winding S1 of the differential transformer is greater than the signal appearing across secondary winding S2, having the same polarity, then diode D2 conducts but diode D4 does not. Current then flows through diode D2 in the direction of the arrow downwardly, as viewed in FIGURE 3, through the resistor $r1$, through diode D3 which is also forward biased in the direction of the arrow and back to the secondary winding through winding S2 thereof. Thus a positive signal is developed across the R–C filter as indicated by the polarity sign. Similarly if the voltage appearing across the secondary winding S2 is greater in magnitude than at winding S1, than the diode D4 is forward biased as is the diode D1 while diodes D2 and D3 are reversed biased.

The voltage developed across the R–C filter is applied through resistor $r2$ to the base of the transistor Q1 which is connected in the well known emitter follower configuration. Capacitor C2 is connected from the base of transistor Q1 to ground and operates as a high frequency shunt.

Upon the application of the voltage from the R–C filter through the resistor $r2$ to the base of the transistor Q1, nothing occurs since the transistor is biased to a cutoff condition by the bias battery B–1 connected the base thereof and ground. When, however, the voltage appearing at the output of the bridge exceeds a predetermined design voltage established by the bias battery B–1 the Zener diode D5 breaks down shunting the resistor $r2$ and applying a positive bias to the base of the transistor Q1 causing it to conduct. Conduction of transistor Q1 provides a positive voltage signal across the resistive element of the potentiometer P1 connected to the emitter thereof. This voltage signal is tapped by the wiper arm thereof and is applied through the resistor $r6$ as one of the input signals to the logic "and" gate 106. Simultaneously, the voltage appearing at the wiper of the potentiometer P1 is applied through the resistor $r3$ as one of the input signals to the logic "and" gate 116. If the signals applied to the differential transformer TR2 indicate a discrepancy in the manner above described, an output signal is applied through resistor $r7$ as the other input to the logic "and" gate 106, and only under such conditions, that is, when two inputs are applied simultaneously or in coincidence to the base of the transistor Q5 does it conduct. When the transistor Q5 conducts, it provides, effectively, a short circuit around the solenoid coil A thus causing it to become deactivated. Upon deactivation of the solenoid coil A a shutoff valve in the hydraulic system is caused to close and, for example only, the standby channel is deactivated. As will be seen, the solenoid coil A is connected from a source of potential $B+8$ through a resistor $r12$ and also is connected to a source of common potential such as ground through a diode D19. Under normal operating conditions, that is, when no error signal appears, the solenoid coil A is energized and the shutoff valve is open thus permitting the flow of hydraeric fluid in the normally accepted manner. The diode D19 also provides a positive bias to the emitter of the transistor Q5 thus maintaining it in a back biased or cutoff condition to thereby prevent conduction except upon the application of the required signal to the base thereof. The diode D17 is provided to shunt the inductive voltage kick normally associated with any coil upon deactivation thereof, so as to preclude damage to the transistor Q5.

Alternatively, as shown in FIGURE 4, electrical signals for use in the comparator and logic means of the present invention may be generated within the system. As is therein illustrated the active channel includes a typical servo valve 210 having a torque motor 211, flapper 212, nozzles 213 and spool valve 214. The spool valve 214 controls the flow of hydraeric fluid from source P1 through conduits 215 and 216, in response to electrical signals applied to the torque motor 211 by leads 217 (or mechanically). A position transducer 220 is cooperatively connected, as by rod 221, to the spool valve 214. The position transducer 220 develops an electrical signal which is proportional to the spool valve 214 position and may be any transducer device desired such, for example, as the differential transformer above described. The output electrical signal from the position transducer 220 is applied through leads 215 to the electrical comparator and logic means 32. A similar servo valve 310 and 410 and position transducer 320 and 420 is provided in the standby and monitor channels respectively. As above described, upon discrepancy between signals generated in the active, standby or monitor channel servo valves, a control signal is developed by the comparator and logic means and is applied through the lead 36 to the fluid switch means 37 to disable the channel wherein such discrepancy occurred.

There has thus been disclosed an apparatus for monitoring electrical signals applied to a redundant control system or developed thereby during operation and upon a discrepancy being found therein, to transfer control of

What is claimed is:
1. Apparatus for monitoring electrical signals in a redundant hydraeric control system and switching in event of a failure occurring in said system comprising:
  (A) active, standby, and monitor channels each including a servo valve;
  (B) individual means operatively connected to each of said servo valves and providing a separate electrical input signal thereto, said signals being substantially identical during normal system operation;
  (C) electrical signal comparator and logic means connected to receive said electrical input signals from said individual means for comparing the same and for developing an output signal in response to differences between said electrical input signals;
  (D) fluid control switch means connected to receive said output signal;
  (E) a source of hydraeric fluid;
  (F) actuator means; and
  (G) conduit means connecting said source of hydraeric fluid for control by said channels and application through said fluid switch means to said actuator means, said fluid switch means selectively electing the controlling channel responsive to said output signal from said comparator and logic means.

2. Apparatus for monitoring electrical signals in a redundant hydraeric control system and switching in event of a failure occurring in said system comprising:
  (A) an active control channel including
    (1) first electrical input signal receiving means, and
    (2) first servo valve means connected to said first electrical input signal receiving means for receiving signals therefrom to control the flow of hydraeric fluid in response thereto;
  (B) a standby control channel including
    (1) second electrical input signal receiving means, and
    (2) second servo valve means connected to said second electrical input signal receiving means for receiving signals therefrom to control the flow of hydraeric fluid in response thereto;
  (C) a monitor and switching channel including
    (1) third electrical input signal receiving means,
    (2) electrical comparator and logic means connected to said first, second and third electrical input signal receiving means for receiving output electrical signals therefrom to compare the same and develop an output failure signal in sponse to disagreement between the output signals from said first, second and third electrical input signal receiving means, and
    (3) fluid switch means connected to said electrical comparator and logic means for receiving said output failure signal and disconnecting that channel wherein said disagreement occurred;
  (D) electrical input signal generating means connected to said first, second and third electrical input signal receiving means,
  (E) first and second sources of hydraeric fluid connected to said first and second servo valve means respectively for control thereby;
  (F) actuator means;
  (G) first, second and third electrical signal transducer means affixed to said actuator means for producing three output signals each indicative of the position of said actuator.
  (H) means connected between said first, second and third transducers and said first, second, and third electrical input signal receiving means respectively to apply said output signals from said transducers as feedback signals; and
  (I) conduit means connected between said first and second servo valve means and said actuator means through said fluid switch means for conducting said hydraeric fluid from one of said channels to said actuator in response to input signals from said input signal generating means.

3. A control system as defined in claim 2 in which said electrical comparator means includes first, second and third difference signal sensitive means each connected to receive a different pair of output signals from said first, second and third voltage level switch means connected respectively to said first, second and third difference signal sensitive means, said voltage level switch means being closed only when the difference signal from said difference signal sensitive means exceeds a predetermined value.

4. A control system as defined in claim 3 in which said difference signal sensitive means is a differential transformer.

5. A control system as defined in claim 3 in which said voltage level switch means is a resistive impedance element shunted by a Zener diode.

6. A control system as defined in claim 3 in which said electrical comparator means further includes first and second coincidence switch means, means connecting said first voltage level switch means to each of said first and second coincidence switch means, means connecting said second voltage level switch means to said first coincidence switch means, and means connecting said third voltage level switch means to said second coincidence switch means.

7. A control system as defined in claim 6 in which said coincidence switches are each a transistor connected in common emitter configuration with the base thereof connected to receive the output from said voltage level switch means.

8. A control system as defined in claim 7 wherein said fluid switch means includes first and second solenoid actuated valves each of which includes a solenoid coil, said first solenoid valve coil being connected across the collector and emitter of said transistor in said first coincidence switch means and said second solenoid valve coil being connected across the collector and emitter of said transistor in said second coincidence switch means.

9. A control system as defined in claim 8 wherein each of said solenoid valve coils is energized except upon operation of said coincidence switch means connected thereto.

References Cited

UNITED STATES PATENTS

| | | | |
|---|---|---|---|
| 2,947,286 | 8/1960 | Baltus et al. | 91—365 |
| 2,995,014 | 8/1961 | Horky et al. | 91—387 |
| 3,220,317 | 11/1965 | Fuell | 91—361 XR |
| 3,257,911 | 6/1966 | Garnjost et al. | 91—365 X |
| 3,263,572 | 8/1966 | Sunderland | 91—361 XR |
| 3,270,623 | 9/1966 | Garnjost et al. | 91—387 |

EVERETTE A. POWELL, Jr., *Primary Examiner.*

U.S. Cl. X.R.

91—365, 387